Aug. 19, 1941.  L. A. FISCHER  2,253,372
VALVE
Original Filed Feb. 21, 1939
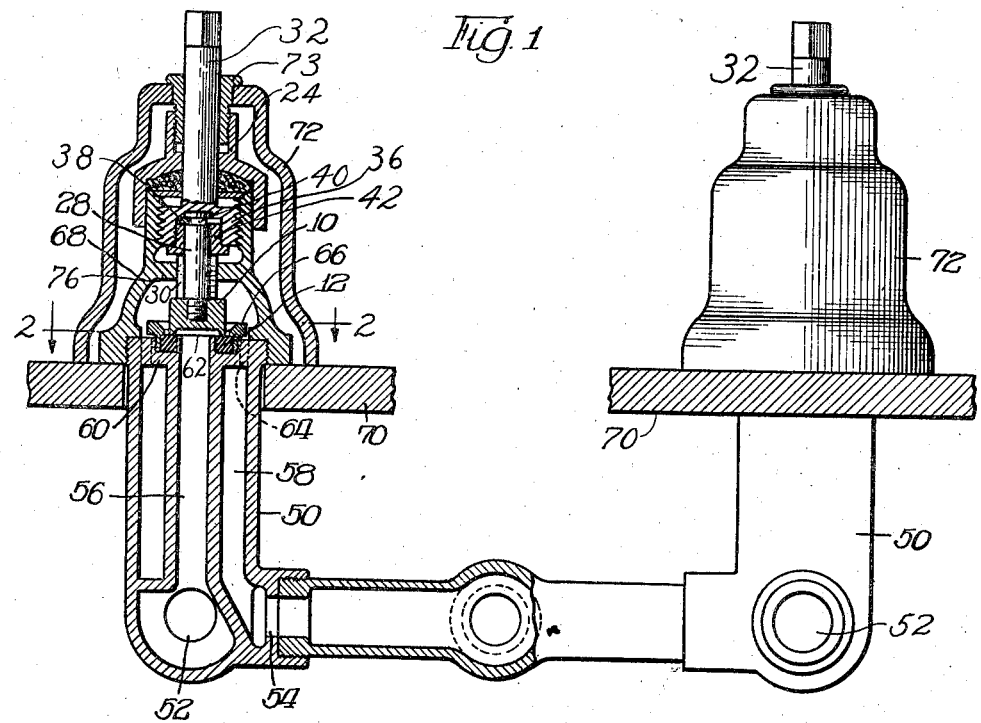
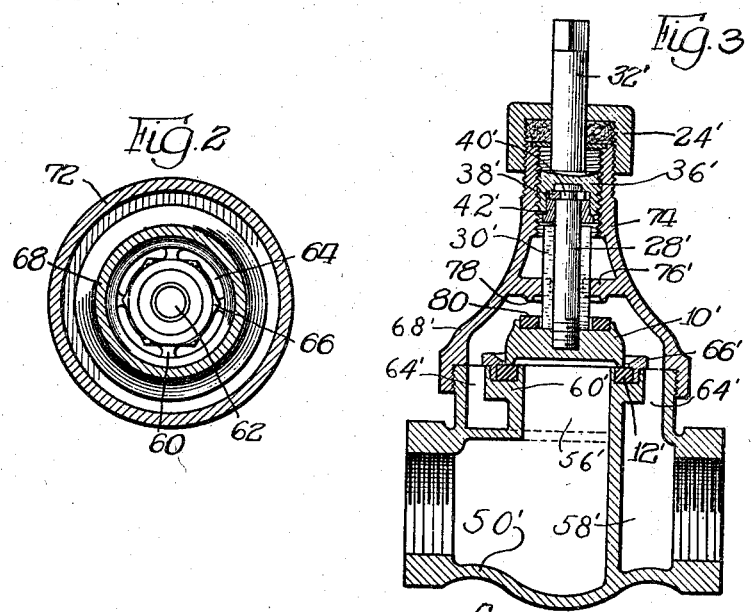
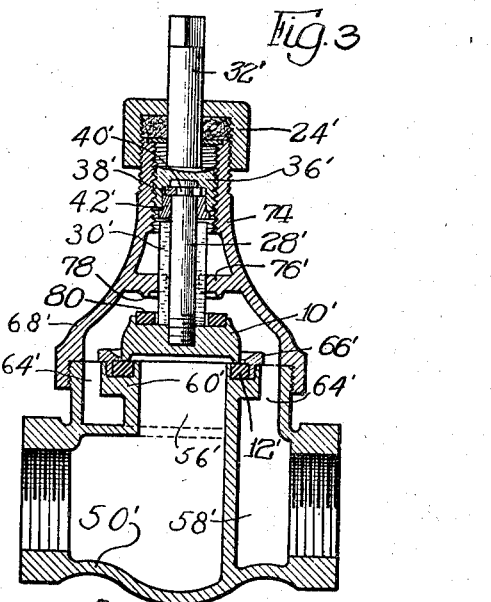
INVENTOR
Leo A. Fischer
By Staley + McLeh
ATTORNEYS Patented Aug. 19, 1941

2,253,372

UNITED STATES PATENT OFFICE 2,253,372

VALVE

Leo A. Fischer, Springfield, Ohio

Original application February 21, 1939, Serial No. 257,691. Divided and this application April 29, 1940, Serial No. 332,295

2 Claims. (Cl. 251—156)

This invention relates to improvements in valves, this application being a division of my pending application Serial No. 257,691, filed February 21, 1939.

The invention relates more particularly to valves which are of a built-in character, that is, in which the connecting inlet and outlet pipes are behind a fixed member such as the wall of a bathroom, sink, or wash basin, and the valve proper is on the opposite or outer side of the wall; the invention also relating to a valve which may be applied to a fitting in a steam pipe, or other like form of pipe.

The object of the invention is to provide an arrangement when the valve and its inlet and outlet pipes are installed as described whereby the valve mechanism such as the valve head and its seat may be readily removed without disturbing the wall to which the valve is applied or the connected inlet and outlet pipes; the invention also relating to an arrangement in which the valve mechanism including the seat may be readily removed from a steam pipe fitting, or other fitting of a like nature, without disturbing the fitting or the pipes connected therewith.

Another object of the invention relates to an arrangement whereby a removable valve seat and its retainer may be readily removed by the fingers or by a wrench applied to the retainer.

In the accompanying drawing:

Fig. 1 is a view partly in section and partly in elevation showing the valve applied to a built-in fixture.

Fig. 2 is a section on the line 2—2 of Fig. 1.

Fig. 3 is a modification showing the valve applied to a steam pipe.

Referring to the drawing, 50 represents a valve base provided with an inlet 52 and an outlet 54. The inlet 52 is connected with an extension passage or extended inlet port 56 and the outlet 54 is connected with a parallel extension passage or extended outlet port 58. These passages may be annular or semi-cylindrical or any other desired shape. The valve base 50 is provided with an extension head or port face 60 which is perforated at the center with a hole 62 communicating with the extension passage 56 and is perforated annularly with the openings 64 which communicate with the outlet extension passage 58.

The seat washer 12 is seated in this extension head and is retained in place by an annular threaded cap 66 screwed into the face 60 and having straight exterior faces to receive a wrench. The valve disk or head 10 seats against the outside of the seat washer 12 and closes against the pressure of the water. In installing the cap 66 it may be left quite loose, being screwed in only with the fingers, the disk or head 10 providing the necessary pressure for sealing the washer against the extension head 60 so that the cap is thus comparatively easily removed in spite of corrosion, but in the event that the cap 66 could not readily be removed by the fingers a wrench may be applied thereto for the purpose. If a removable seat which had a threaded connection with the extension head were used, however, it would have to be screwed in tightly enough to be water-tight and it would, therefore, be difficult to remove after corrosion. This would be particularly true if the seat were located in the base 50 because in that case it would be necessary to employ a tool to engage the walls of the opening of the seat to unloosen it by a twisting action of the tool which has the effect of reaming out the opening in the seat to such an extent that the tool would not properly engage with the walls of the opening and thereby make it extremely difficult to remove the seat.

The valve disk 10 is screwed tightly onto a sliding valve stem 28. This stem projects through an aperture of a division wall 76 on the interior of a valve housing 68, the housing having a threaded connection with the head portion of the base 50 and is provided with wings 30 which slide in suitable grooves in said wall and thus permit vertical movement of the valve seat 28 and disk 10 but positively preventing rotation thereof. The longitudinal or vertical movement of the valve stem may be produced in a variety of ways. The preferred form, however, is to provide a screw stem 32, the outer end of which has a plurality of straight sides to receive a suitable handle (not shown) and the lower end of which has an enlargement 36 provided with external screw-threads engaging like threads on the interior of the housing 68. The enlargement 36 is provided with a suitable socket in which the sliding stem 28 is inserted and pivotally secured. One of the simplest forms of pivotal linking is that illustrated in which a split washer 38 is inserted in an annular groove 40 at the head of the sliding stem 28 after an externally threaded sleeve 42 has been slid onto the sliding stem. This sleeve 42 is then screwed into the internally threaded enlargement 36 holding the split washer in the socket in said housing and through it holding the sliding stem also in said socket. A packing gland is provided at the upper end of the valve stem which comprises a cup-shaped cylindrical member 24 which is secured to the valve head preferably by screw-threads (not shown). A bonnet 72 encloses the parts and is held in position by a flanged nut 73 which is screwed into an extension of the cup 24.

In Fig. 1 the valve mechanism is shown applied to a fixed structure 70 which may be the wall of a bathroom or the wall to which a kitchen sink is attached or it may represent the wall of a wash basin or the like. It will be seen from this arrangement that if it is desired to remove and replace the valve seat 12 it is only necessary to remove the bonnet 72 and the valve mechanism other than the valve seat and its retaining ring after which the retaining ring is readily accessible to be removed either by the fingers or by a wrench or other suitable tool applied to the exterior thereof to thereby enable the seat to be removed.

In Fig. 3 the valve mechanism is shown applied to a fitting 50' threaded to receive inlet and outlet steam pipes or other pipes (not shown), this fitting having an extended base portion having a perforated head 60' upon which the valve seat 12' rests, the valve seat being held in position by a retaining ring 66' screwed into the head of the base. The extension has an inlet passage 56' and outlet openings 64' communicating with the outlet passage 58'. The valve head 10' is screwed upon a stem 28' the upper end of which projects into a socket in the head 36' of the stem 32', this head 36' being threaded into the upper end of the housing 68' which has a threaded connection with the extension of the fitting 50'. The valve stem 28' has a swivel connection with the head 36' in the same manner described in connection with Fig. 1, the stem 28' being provided with a groove 40' which receives a split washer 38' with a sleeve 42' threaded into the head 36'. The stem 28' has wings 30' projecting through slots in the division wall 76' of the valve head to prevent the valve head 10' and its stem 28' from turning. A cap 24' is screwed onto the upper end of the valve housing 68' to retain packing material. To prevent escape of steam the valve member 10' is provided with a washer 80 which seats against a seat 78 on the division wall 76'.

By the arrangement shown in Fig. 3 it will be seen that it will be unnecessary to disturb the fitting 50' in the event that it is desired to remove the retaining ring 66' and the valve seat 12', the only thing required being to remove the valve housing 68', after which the retaining ring may be unscrewed either by the fingers or by the application of a tool such as a wrench thereto, and the valve seat 12' then readily removed for renewal.

Having thus described my invention, I claim:

1. In a valve adapted for installation in a fixed wall, a fitting having an inlet and outlet both adapted to be located on the inner side of said wall, said fitting having an extension adapted to project through an aperture in said wall and slightly beyond the same so that the outer end thereof is readily accessible from the outer side of said wall, a removable yieldable valve seat fitted in a groove in the outer end of said extension, a retaining ring for said seat having a threaded connection with the outer end of said extension and having its outer periphery formed to receive a tool for removal purposes, said extension having a supply passage and a discharge passage communicating with said inlet and outlet, a valve housing having a threaded connection with the outer end of said extension and adapted to bear upon the outer side of said wall about the aperture therethrough, said housing having a chamber through which fluid from the supply passage passes to the exhaust passage, and a movable valve member cooperating with said valve seat.

2. In a valve adapted for installation in a fixed wall, a fitting having an inlet and outlet both adapted to be located on the inner side of said wall, said fitting having an extension adapted to project through an aperture in said wall and slightly beyond the same so that the outer end thereof is readily accessible from the outer side of said wall, said extension having a groove in the outer end thereof, the inner and outer walls of which are formed by said extension, a removable yieldable valve seat fitted in said groove, a retaining ring for said seat partly overlying the same and having a threaded connection with the outer wall of said groove so that the yieldable valve seat will be confined between the ring and the inner wall of the groove, said ring being formed to receive a tool for removal purposes, said extension having a supply passage and a discharge passage communicating with said inlet and outlet, a valve housing having a threaded connection with the outer end of said extension and adapted to bear upon the outer side of said wall about the aperture therethrough, said housing having a chamber through which fluid from the supply passage passes to the exhaust passage, and a movable valve member cooperating with said valve seat.

LEO A. FISCHER.